(12) United States Patent
Bunea et al.

(10) Patent No.: US 11,824,487 B2
(45) Date of Patent: Nov. 21, 2023

(54) PHOTOVOLTAIC MODULE SYSTEMS AND METHODS

(71) Applicant: GAF Energy LLC, Parsippany, NJ (US)

(72) Inventors: Gabriela Bunea, San Jose, CA (US); Thierry Nguyen, San Francisco, CA (US); Richard Perkins, San Jose, CA (US); Nicholas Boitnott, San Francisco, CA (US); David Kavulak, San Francisco, CA (US); Lewis Abra, San Francisco, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 18/316,778

(22) Filed: May 12, 2023

(65) Prior Publication Data

US 2023/0291347 A1    Sep. 14, 2023

Related U.S. Application Data

(63) Continuation of application No. PCT/US2021/058785, filed on Nov. 10, 2021.
(Continued)

(51) Int. Cl.
*H02S 20/25* (2014.01)
*H02S 40/34* (2014.01)

(52) U.S. Cl.
CPC ............. *H02S 20/25* (2014.12); *H02S 40/34* (2014.12)

(58) Field of Classification Search
CPC .......... H02S 20/22; H02S 20/23; H02S 20/24; H02S 20/25; H02S 20/26
See application file for complete search history.

(56) References Cited

U.S. PATENT DOCUMENTS 1,981,467 A    11/1934 Radtke
3,156,497 A    11/1964 Lessard
(Continued)

FOREIGN PATENT DOCUMENTS

CA    2829440 A    5/2019
CH    700095 A2    6/2010
(Continued)

OTHER PUBLICATIONS

Sunflare, Procducts: "Sunflare Develops Prototype For New Residential Solar Shingles"; 2019 <<sunflaresolar.com/news/sunflare-develops-prototype-for-new-residential-solar-shingles>> retrieved Feb. 2, 2021.
(Continued)

*Primary Examiner* — Daniel P Malley, Jr.
(74) *Attorney, Agent, or Firm* — GREENBERG TRAURIG, LLP

(57) ABSTRACT

Some embodiments of the present disclosure relate to methods that may include attaching a first photovoltaic module and a second photovoltaic module to a back-sheet, wherein the first photovoltaic module includes a first end and a second end, and wherein the second photovoltaic module includes a first end and a second end; forming a seam on the back-sheet between the first and second photovoltaic modules; forming an electrical connection between the first and second photovoltaic modules by electrically connecting the first end of the first photovoltaic module to the second end of the second photovoltaic module; and separating the first and second photovoltaic modules along the seam while maintaining the electrical connection between the first and second photovoltaic modules. Some embodiments of the present disclosure relate to roofing systems that may include photovoltaic modules.

15 Claims, 3 Drawing Sheets

Related U.S. Application Data

(60) Provisional application No. 63/113,503, filed on Nov. 13, 2020.

(56) References Cited

U.S. PATENT DOCUMENTS

| | | |
|---|---|---|
| 4,258,948 A | 3/1981 | Hoffmann |
| 4,349,220 A | 9/1982 | Carroll et al. |
| 4,499,702 A | 2/1985 | Turner |
| 4,636,577 A | 1/1987 | Peterpaul |
| 5,167,579 A | 12/1992 | Rotter |
| 5,437,735 A | 8/1995 | Younan et al. |
| 5,590,495 A | 1/1997 | Bressler et al. |
| 5,642,596 A | 7/1997 | Waddington |
| 6,008,450 A | 12/1999 | Ohtsuka et al. |
| 6,033,270 A | 3/2000 | Stuart |
| 6,046,399 A | 4/2000 | Kapner |
| 6,320,114 B1 | 11/2001 | Kuechler |
| 6,320,115 B1 | 11/2001 | Kataoka et al. |
| 6,336,304 B1 | 1/2002 | Mimura et al. |
| 6,341,454 B1 | 1/2002 | Koleoglou |
| 6,407,329 B1 | 6/2002 | Iino et al. |
| 6,576,830 B2 | 6/2003 | Nagao et al. |
| 6,928,781 B2 | 8/2005 | Desbois et al. |
| 6,972,367 B2 | 12/2005 | Federspiel et al. |
| 7,138,578 B2 | 11/2006 | Komamine |
| 7,155,870 B2 | 1/2007 | Almy |
| 7,178,295 B2 | 2/2007 | Dinwoodie |
| 7,487,771 B1 | 2/2009 | Eiffert et al. |
| 7,587,864 B2 | 9/2009 | McCaskill et al. |
| 7,678,990 B2 | 3/2010 | McCaskill et al. |
| 7,678,991 B2 | 3/2010 | McCaskill et al. |
| 7,748,191 B2 | 7/2010 | Podirsky |
| 7,819,114 B2 | 10/2010 | Augenbraun et al. |
| 7,824,191 B1 | 11/2010 | Podirsky |
| 7,832,176 B2 | 11/2010 | McCaskill et al. |
| 8,118,109 B1 | 2/2012 | Hacker |
| 3,173,889 A1 | 5/2012 | Kalkanoglu et al. |
| 8,168,880 B2 | 5/2012 | Jacobs et al. |
| 8,210,570 B1 | 7/2012 | Railkar et al. |
| 8,276,329 B2 | 10/2012 | Lenox |
| 8,312,693 B2 | 11/2012 | Cappelli |
| 8,319,093 B2 | 11/2012 | Kalkanoglu et al. |
| 8,333,040 B2 | 12/2012 | Shiao et al. |
| 8,371,076 B2 | 2/2013 | Jones et al. |
| 8,375,653 B2 | 2/2013 | Shiao et al. |
| 8,404,967 B2 | 3/2013 | Kalkanoglu et al. |
| 8,410,349 B2 | 4/2013 | Kalkanoglu et al. |
| 8,418,415 B2 | 4/2013 | Shiao et al. |
| 8,438,796 B2 | 5/2013 | Shiao et al. |
| 8,468,754 B2 | 6/2013 | Railkar et al. |
| 8,468,757 B2 | 6/2013 | Krause et al. |
| 8,505,249 B2 | 8/2013 | Geary |
| 8,512,866 B2 | 8/2013 | Taylor |
| 8,513,517 B2 | 8/2013 | Kalkanoglu et al. |
| 8,586,856 B2 | 11/2013 | Kalkanoglu et al. |
| 8,601,754 B2 | 12/2013 | Jenkins et al. |
| 8,629,578 B2 | 1/2014 | Kurs et al. |
| 8,646,228 B2 | 2/2014 | Jenkins |
| 8,656,657 B2 | 2/2014 | Livsey et al. |
| 8,671,630 B2 | 3/2014 | Lena et al. |
| 8,677,702 B2 | 3/2014 | Jenkins |
| 8,695,289 B2 | 4/2014 | Koch et al. |
| 8,713,858 B1 | 5/2014 | Xie |
| 8,713,860 B2 | 5/2014 | Railkar et al. |
| 8,733,038 B2 | 5/2014 | Kalkanoglu et al. |
| 8,789,321 B2 | 7/2014 | Ishida |
| 8,793,940 B2 | 8/2014 | Kalkanoglu et al. |
| 8,793,941 B2 | 8/2014 | Bosler et al. |
| 8,826,607 B2 | 9/2014 | Shiao et al. |
| 8,835,751 B2 | 9/2014 | Kalkanoglu et al. |
| 8,863,451 B2 | 10/2014 | Jenkins et al. |
| 8,898,970 B2 | 12/2014 | Jenkins et al. |
| 8,925,262 B2 | 1/2015 | Railkar et al. |
| 8,943,766 B2 | 2/2015 | Gombarick et al. |
| 8,946,544 B2 | 2/2015 | Jabos et al. |
| 8,950,128 B2 | 2/2015 | Kalkanoglu et al. |
| 8,959,848 B2 | 2/2015 | Jenkins et al. |
| 8,966,838 B2 | 3/2015 | Jenkins |
| 8,966,850 B2 | 3/2015 | Jenkins et al. |
| 8,994,224 B2 | 3/2015 | Mehta et al. |
| 9,032,672 B2 | 5/2015 | Livsey et al. |
| 9,166,087 B2 | 10/2015 | Chihlas et al. |
| 9,169,646 B2 | 10/2015 | Rodrigues et al. |
| 9,170,034 B2 | 10/2015 | Bosler et al. |
| 9,178,465 B2 | 11/2015 | Shiao et al. |
| 9,202,955 B2 | 12/2015 | Livsey et al. |
| 9,212,832 B2 | 12/2015 | Jenkins |
| 9,217,584 B2 | 12/2015 | Kalkanoglu et al. |
| 9,270,221 B2 | 2/2016 | Zhao |
| 9,273,885 B2 | 3/2016 | Rordigues et al. |
| 9,276,141 B2 | 3/2016 | Kalkanoglu et al. |
| 9,331,224 B2 | 5/2016 | Koch et al. |
| 9,356,174 B2 | 5/2016 | Duarte et al. |
| 9,359,014 B1 | 6/2016 | Yang et al. |
| 9,385,255 B2 | 7/2016 | Wiedeman et al. |
| 9,412,890 B1 | 8/2016 | Meyers |
| 9,528,270 B2 | 12/2016 | Jenkins et al. |
| 9,605,432 B1 | 3/2017 | Robbins |
| 9,711,672 B2 | 7/2017 | Wang |
| 9,755,573 B2 | 9/2017 | Livsey et al. |
| 9,786,802 B2 | 10/2017 | Shiao et al. |
| 9,831,818 B2 | 11/2017 | West |
| 9,912,284 B2 | 3/2018 | Svec |
| 9,923,515 B2 | 3/2018 | Rodrigues et al. |
| 9,938,729 B2 | 4/2018 | Coon |
| 9,991,412 B2 | 6/2018 | Gonzalez et al. |
| 9,998,067 B2 | 6/2018 | Kalkanoglu et al. |
| 10,027,273 B2 | 7/2018 | West et al. |
| 10,115,850 B2 | 10/2018 | Rodrigues et al. |
| 10,128,660 B1 | 11/2018 | Apte et al. |
| 10,156,075 B1 | 12/2018 | McDonough |
| 10,187,005 B2 | 1/2019 | Rodrigues et al. |
| 10,256,765 B2 | 4/2019 | Rodrigues et al. |
| 10,284,136 B1 | 5/2019 | Mayfield et al. |
| 10,454,408 B2 | 10/2019 | Livsey et al. |
| 10,530,292 B1 | 1/2020 | Cropper et al. |
| 10,560,048 B2 | 2/2020 | Fisher et al. |
| 10,563,406 B2 | 2/2020 | Kalkanoglu et al. |
| D879,031 S | 3/2020 | Lance et al. |
| 10,784,813 B2 | 9/2020 | Kalkanoglu et al. |
| D904,289 S | 12/2020 | Lance et al. |
| 11,012,026 B2 | 5/2021 | Kalkanoglu et al. |
| 11,177,639 B1 | 11/2021 | Nguyen et al. |
| 11,217,715 B2 | 1/2022 | Sharenko |
| 11,251,744 B1 | 2/2022 | Bunea et al. |
| 11,258,399 B2 | 2/2022 | Kalkanoglu et al. |
| 11,283,394 B2 | 3/2022 | Perkins et al. |
| 11,424,379 B2 | 8/2022 | Sharenko et al. |
| 11,431,280 B2 | 8/2022 | Liu et al. |
| 11,431,281 B2 | 8/2022 | Perkins et al. |
| 2002/0053360 A1 | 5/2002 | Kinoshita et al. |
| 2002/0129849 A1 | 9/2002 | Heckeroth |
| 2003/0101662 A1 | 6/2003 | Ullman |
| 2003/0132265 A1 | 7/2003 | Villela et al. |
| 2003/0217768 A1 | 11/2003 | Guha |
| 2005/0115603 A1 | 6/2005 | Yoshida et al. |
| 2005/0144870 A1 | 7/2005 | Dinwoodie |
| 2006/0042683 A1 | 3/2006 | Gangemi |
| 2006/0046084 A1 | 3/2006 | Yang et al. |
| 2007/0181174 A1 | 8/2007 | Ressler |
| 2007/0193618 A1 | 8/2007 | Bressler et al. |
| 2007/0249194 A1 | 10/2007 | Liao |
| 2007/0295385 A1 | 12/2007 | Sheats et al. |
| 2008/0006323 A1 | 1/2008 | Kalkanoglu et al. |
| 2008/0035140 A1 | 2/2008 | Placer et al. |
| 2008/0078440 A1 | 4/2008 | Lim et al. |
| 2008/0271774 A1 | 11/2008 | Kalkanoglu et al. |
| 2008/0302030 A1 | 12/2008 | Stancel et al. |
| 2008/0314434 A1* | 12/2008 | Khouri .......... H01L 31/052 136/251 |
| 2008/0315061 A1 | 12/2008 | Fath |
| 2009/0000222 A1 | 1/2009 | Kalkanoglu et al. |
| 2009/0014058 A1 | 1/2009 | Croft et al. |
| 2009/0019795 A1 | 1/2009 | Szacsvay et al. |

(56) References Cited

U.S. PATENT DOCUMENTS

| | | |
|---|---|---|
| 2009/0044850 A1 | 2/2009 | Kimberley |
| 2009/0114261 A1 | 5/2009 | Stancel et al. |
| 2009/0133340 A1 | 5/2009 | Shiao et al. |
| 2009/0159118 A1 | 6/2009 | Kalkanoglu et al. |
| 2009/0178350 A1 | 7/2009 | Kalkanoglu et al. |
| 2009/0229652 A1 | 9/2009 | Mapel et al. |
| 2010/0019580 A1 | 1/2010 | Croft et al. |
| 2010/0101634 A1 | 4/2010 | Frank et al. |
| 2010/0116325 A1 | 5/2010 | Nikoonahad |
| 2010/0131108 A1 | 5/2010 | Meyer |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0170169 A1 | 7/2010 | Railkar et al. |
| 2010/0242381 A1 | 9/2010 | Jenkins |
| 2010/0313499 A1 | 12/2010 | Gangemi |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1 | 3/2011 | Livsey et al. |
| 2011/0058337 A1 | 3/2011 | Han et al. |
| 2011/0061326 A1 | 3/2011 | Jenkins |
| 2011/0100436 A1 | 5/2011 | Cleereman et al. |
| 2011/0104488 A1 | 5/2011 | Muessig et al. |
| 2011/0132427 A1 | 6/2011 | Kalkanoglu et al. |
| 2011/0168238 A1 | 7/2011 | Metin et al. |
| 2011/0239555 A1 | 10/2011 | Cook et al. |
| 2011/0302859 A1 | 12/2011 | Crasnianski |
| 2012/0034799 A1 | 2/2012 | Hunt |
| 2012/0060902 A1 | 3/2012 | Drake |
| 2012/0137600 A1 | 6/2012 | Jenkins |
| 2012/0176077 A1 | 7/2012 | Oh et al. |
| 2012/0212065 A1 | 8/2012 | Cheng et al. |
| 2012/0233940 A1 | 9/2012 | Perkins et al. |
| 2012/0240490 A1 | 9/2012 | Gangemi |
| 2012/0260977 A1 | 10/2012 | Stancel |
| 2012/0266942 A1 | 10/2012 | Komatsu et al. |
| 2012/0279150 A1 | 11/2012 | Pislkak et al. |
| 2012/0291848 A1 | 11/2012 | Sherman et al. |
| 2013/0008499 A1 | 1/2013 | Verger et al. |
| 2013/0014455 A1 | 1/2013 | Grieco |
| 2013/0193769 A1 | 8/2013 | Mehta et al. |
| 2013/0247988 A1 | 9/2013 | Reese et al. |
| 2013/0284267 A1 | 10/2013 | Plug et al. |
| 2013/0306137 A1 | 11/2013 | Ko |
| 2014/0090697 A1 | 4/2014 | Rodrigues et al. |
| 2014/0150843 A1 | 6/2014 | Pearce et al. |
| 2014/0173997 A1 | 6/2014 | Jenkins |
| 2014/0179220 A1 | 6/2014 | Railkar et al. |
| 2014/0182222 A1 | 7/2014 | Kalkanoglu et al. |
| 2014/0254776 A1 | 9/2014 | O'Connor et al. |
| 2014/0266289 A1 | 9/2014 | Della Sera et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0089895 A1 | 4/2015 | Eitch |
| 2015/0340516 A1 | 11/2015 | Kim et al. |
| 2015/0349173 A1 | 12/2015 | Morad et al. |
| 2016/0105144 A1 | 4/2016 | Haynes et al. |
| 2016/0142008 A1 | 5/2016 | Lopez et al. |
| 2016/0254776 A1 | 9/2016 | Rodrigues et al. |
| 2016/0276508 A1 | 9/2016 | Huang et al. |
| 2016/0359451 A1 | 12/2016 | Mao et al. |
| 2017/0159292 A1 | 6/2017 | Chihlas et al. |
| 2017/0179319 A1 | 6/2017 | Yamashita et al. |
| 2017/0179726 A1 | 6/2017 | Garrity et al. |
| 2017/0237390 A1 | 8/2017 | Hudson et al. |
| 2017/0331415 A1 | 11/2017 | Koppi et al. |
| 2018/0094438 A1 | 4/2018 | Wu et al. |
| 2018/0097472 A1 | 4/2018 | Anderson et al. |
| 2018/0254738 A1 | 9/2018 | Yang et al. |
| 2018/0315874 A1* | 11/2018 | Hosken ............... H01L 31/1876 |
| 2018/0351502 A1 | 12/2018 | Almy et al. |
| 2018/0367089 A1 | 12/2018 | Stutterheim et al. |
| 2019/0030867 A1 | 1/2019 | Sun et al. |
| 2019/0081436 A1 | 3/2019 | Onodi et al. |
| 2019/0123679 A1 | 4/2019 | Rodrigues et al. |
| 2019/0305717 A1 | 10/2019 | Allen et al. |
| 2019/0312159 A1* | 10/2019 | Judkins ............... H01L 31/0475 |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |
| 2021/0115223 A1 | 4/2021 | Bonekamp et al. |
| 2021/0159353 A1 | 5/2021 | Li et al. |
| 2021/0343886 A1 | 11/2021 | Sharenko et al. |

FOREIGN PATENT DOCUMENTS

| | | |
|---|---|---|
| CN | 202797032 U | 3/2013 |
| DE | 1958248 A1 | 11/1971 |
| EP | 1039361 A1 | 9/2000 |
| EP | 1837162 A1 | 9/2007 |
| EP | 1774372 A1 | 7/2011 |
| EP | 2446481 A2 | 5/2012 |
| EP | 2784241 A1 | 10/2014 |
| JP | 10046767 A | 2/1998 |
| JP | 2002-106151 A | 4/2002 |
| JP | 2001-098703 A | 10/2002 |
| JP | 2017-027735 A | 2/2017 |
| JP | 2018053707 A | 4/2018 |
| KR | 10-2019-0000367 A | 1/2019 |
| KR | 10-2253483 B1 | 5/2021 |
| WO | 2011/049944 A1 | 4/2011 |
| WO | 2015/133632 A1 | 9/2015 |
| WO | 2018-209056 A1 | 11/2018 |
| WO | 2019/201416 A1 | 10/2019 |
| WO | 2020-159358 A1 | 8/2020 |

OTHER PUBLICATIONS

RGS Energy, 3.5KW Powerhouse 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

"Types of Roofing Underlayment", Owens Corning Roofing; <<https://www.owenscorning.com/en-us/roofing/tools/how-roofing-underlayment-helps-protect-your-home>> retrieved Nov. 1, 2021.

* cited by examiner

PHOTOVOLTAIC MODULE SYSTEMS AND METHODS

CROSS-REFERENCE TO RELATED APPLICATIONS

This application claims priority to U.S. Provisional Application No. 63/113,503, filed on Nov. 13, 2020, the entire contents of which are incorporated herein by reference.

FIELD

The present disclosure relates to solar shingles and methods of manufacturing solar shingles.

BACKGROUND

Some roofing systems include photovoltaic modules. In some instances, the photovoltaic modules may be designed to be a comparable size and/or shape to asphalt shingles.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Some embodiments of the present disclosure relate to a method. In some embodiments, the method includes attaching a first photovoltaic module and a second photovoltaic module to a back-sheet. In some embodiments, the first photovoltaic module includes a first end and a second end, and the second photovoltaic module includes a first end and a second end. In some embodiment, the method includes forming a seam on the back-sheet between the first and second photovoltaic modules, forming an electrical connection between the first and second photovoltaic modules by electrically connecting the first end of the first photovoltaic module to the second end of the second photovoltaic module, and separating the first and second photovoltaic modules along the seam while maintaining the electrical connection between the first and second photovoltaic modules.

In some embodiments, attaching the first and second photovoltaic modules to the back-sheet includes laminating the first and second photovoltaic modules to the back-sheet.

In some embodiments, attaching the first and second photovoltaic modules to the back-sheet comprises attaching the first photovoltaic module substantially parallel to the second photovoltaic module.

In some embodiments, the back-sheet comprises TPO.

In some embodiments, the back-sheet may be configured to electrically insulate the first and second photovoltaic modules.

In some embodiments, the back-sheet may be configured to be attached to a roofing substrate.

In some embodiments, the method includes attaching the back-sheet to a roofing substrate.

In some embodiments, attaching the back-sheet to a roofing substrate includes nailing the back-sheet to a roofing substrate.

In some embodiments, the method includes using an adhesive to attach the back-sheet to a roofing substrate.

In some embodiments, separating the first and second photovoltaic modules along the seam comprises cutting along the seam.

In some embodiments, the electrically connected first and second photovoltaic modules may be operable with a single junction box, a pair of connectors, and a single optimizer.

In some embodiments, the first photovoltaic module includes a length and a width, and wherein the length is greater than the width.

In some embodiments, the second photovoltaic module includes a length and a width, and wherein the length is greater than the width.

In some embodiments, the method includes folding the first photovoltaic module relative to the second photovoltaic module to form a stack of the first and second photovoltaic modules.

In some embodiments, the first and second photovoltaic modules are solar shingles.

Some embodiments of the present disclosure relate to a roofing system. In some embodiments, the roofing system includes a roofing substrate, a photovoltaic module, and a back-sheet comprising a first surface and a second surface. In some embodiments, the photovoltaic module may be attached to the first surface of the back-sheet. In some embodiments, the back-sheet may be configured to electrically insulate the photovoltaic module. In some embodiments, the second surface of the back-sheet may be configured to attach to the roofing substrate.

In some embodiments, the back-sheet comprises TPO.

In some embodiments, the photovoltaic module is a solar roofing shingle.

In some embodiments, the second surface of the back-sheet comprises an adhesive.

In some embodiments, the roofing system comprises a removable cover attached to the adhesive.

Some embodiments of the present disclosure are directed to a roofing system comprising a roofing substrate, a first photovoltaic module, a second photovoltaic module, and an electrical connector comprising a first end and a second end. In some embodiments, the first end of the electrical connector may be connected to the first photovoltaic module, and the second end of the electrical connector is connected to the second photovoltaic module. In some embodiments, the roofing system comprises a back-sheet comprising a first surface and a second surface, wherein the first and second photovoltaic modules may be attached to the first surface of the back-sheet, wherein the back-sheet may be configured to electrically insulate the first and second photovoltaic modules, and wherein the second surface of the back-sheet may be configured to attach to the roofing substrate.

In some embodiments, the back-sheet comprises a seam between the first and second photovoltaic modules.

BRIEF DESCRIPTION OF THE DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Figure 1:
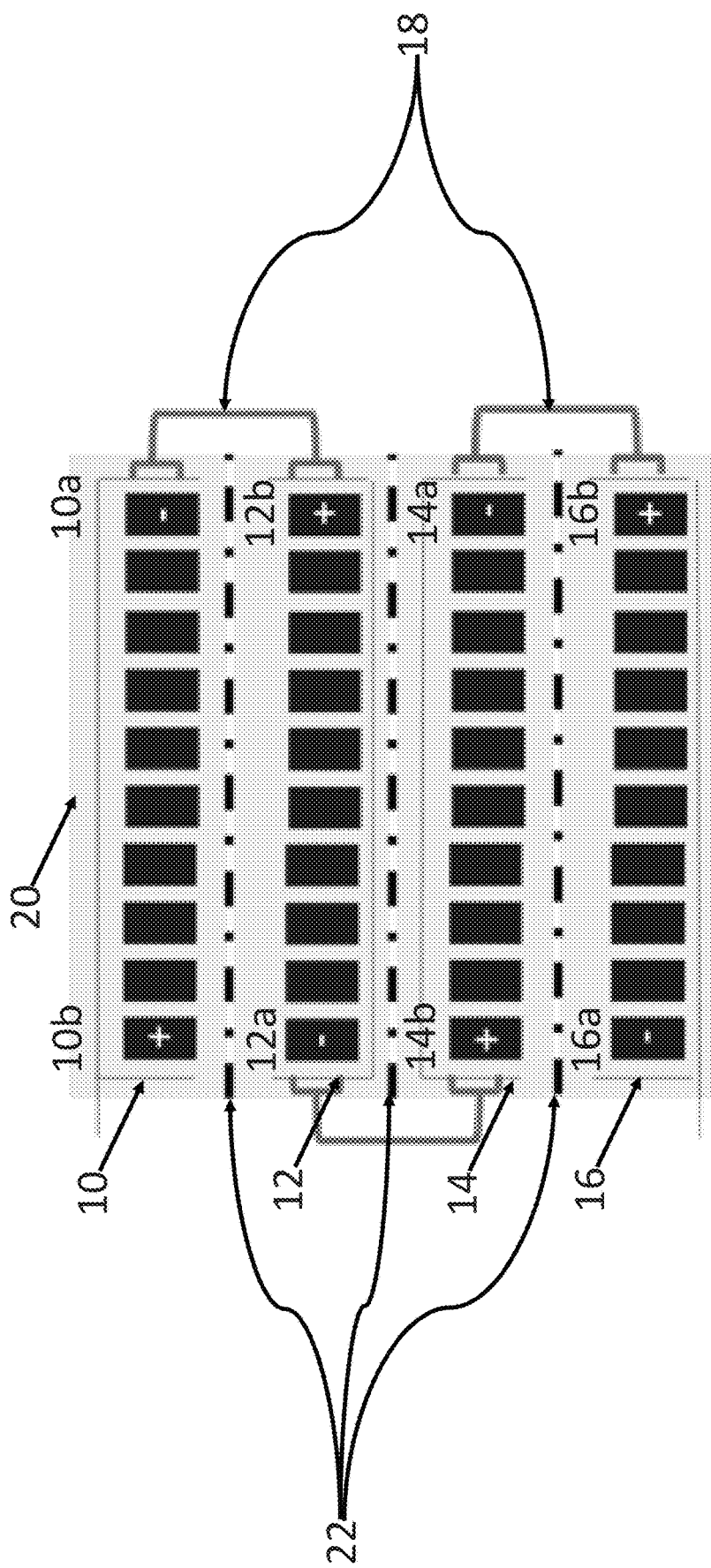
FIG. 1 depicts an exemplary embodiment a plurality of photovoltaic modules in a first configuration.

Among those benefits and improvements that have been disclosed other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, the term "consisting essentially of" limits the scope of a specific claim to the specified materials or steps and those that do not materially affect the basic and novel characteristic or characteristics of the specific claim.

As used herein, terms such as "consisting of" and "composed of" limit the scope of a specific claim to the materials and steps recited by the claim.

All prior patents, publications, and test methods referenced herein are incorporated by reference in their entireties.

Some embodiments of the present invention related to roofing systems. In some embodiments, the roofing system may include a roofing substrate. The roofing substrate may be any suitable roofing substrate known to those skilled in the art, including plywood, glass, cellulosic, a shingle, a glass mat, a fiberglass mat, an underlayment, a roofing membrane, a roof deck, a modified bitumen (MODBIT) substrate, a chimney, a polyisocyanurate (ISO) foam board, or any combination thereof.

In some embodiments, the roofing system may include a photovoltaic module. In some embodiments, the roofing system may include a first photovoltaic module and a second photovoltaic module. In some embodiments, the roofing system may include more than two photovoltaic modules. The photovoltaic modules may be any photovoltaic modules known to those skilled in the art that may be configured to attach to a roofing substrate. For example, in some embodiments, the photovoltaic modules may be solar panels. In addition, in some embodiments, the photovoltaic modules may be solar shingles. In some embodiments the solar shingles may be a comparable size and/or shape to asphalt shingles.

In some embodiments, the first photovoltaic module may include a length and a width. In some embodiments, the length and the width may be the same size. In some embodiments, the width may be greater than the length. In some embodiments, the length may be greater than the width. In some embodiments, the second photovoltaic module may include a length and a width. In some embodiments, the length and the width may be the same size. In some embodiments, the width may be greater than the length. In some embodiments, the length may be greater than the width. In some embodiments, the first photovoltaic module and the second photovoltaic module may have the same size and/or shape. In some embodiments, the first photovoltaic module and the second photovoltaic module may have a different size and/or shape.

In some embodiments the first photovoltaic module may be connected to the second photovoltaic module. In some embodiments, the first photovoltaic module may be connected to the second photovoltaic module in a manner that permits the first photovoltaic module to be folded relative to the second photovoltaic module to form a stack of the first and second photovoltaic modules.

In some embodiments, the first photovoltaic module may be connected to the second photovoltaic module via an electrical connector. In some embodiments, the electrical connector may be any suitable electrical connector known to those skilled in the art that may be configured to enable operation of the first and second photovoltaic modules.

In some embodiments, the first photovoltaic module and the second photovoltaic module may be connected to at least one junction box. In some embodiments, the junction box may be any suitable enclosure that may be configured to house and/or protect electrical wires and/or cables that may be joined together. In some embodiments, the first photovoltaic module and the second photovoltaic module may be connected to a least one optimizer. In some embodiments, the optimizer may be any suitable optimizer known to those skilled in the art that may be configured to maximize the energy harvested from the photovoltaic modules. In some embodiments, the electrical connector may be configured such that when the electrical connector is connected to the first photovoltaic module and the second photovoltaic module, the first photovoltaic module and the second photovoltaic module may be configured to operate together with a single junction box and a single optimizer. In some embodiments, the electrical connector may be configured such that when the electrical connector is connected to the first photovoltaic module and the second photovoltaic module, the first photovoltaic module and the second photovoltaic module may be configured to operate together with a plurality of junction boxes and a plurality of optimizers.

In some embodiments, the electrical connector may include a first end and a second end. In some embodiments, the first end of the electrical connector may be connected to the first photovoltaic module and the second end of the electrical connector may be connected to the second photovoltaic module. In some embodiments, the first photovoltaic module may have a first end and a second end. In some embodiments, the second photovoltaic module may have a first end and a second end. In some embodiments, the first end of the first photovoltaic module may be connected to the second end of the second photovoltaic module. In some embodiments, the electrical connector may be configured to connect the first end of the first photovoltaic module to the second end of the second photovoltaic module.

In some embodiments, the first photovoltaic module and the second photovoltaic module may be attached to a back-sheet. In some embodiments, the back-sheet may comprise any suitable material known to those skilled in the art that may be configured to attach to a photovoltaic module. In some embodiments, the back-sheet may comprise any suitable material known to those skilled in the art that may be configured to attached to a roofing substrate. In some embodiments, the back-sheet may comprise any suitable material known to those skilled in the art that may be configured to electrically insulate a photovoltaic module. For example, in some embodiments, the back sheet may comprise TPO, PVC, EPDM, modified bitumen, or any combination thereof.

In some embodiments, the back-sheet may include a first surface and a second surface. In some embodiments, the first surface of the back-sheet may be configured to attach to a photovoltaic module. In some embodiments, the first surface of the back-sheet may be configured to be attached to the photovoltaic module using any suitable means known to those skilled in the art, including adhesives, mechanical attachments, lamination, extrusion, co-extrusion, rolling, or any combination thereof.

In some embodiments, the second surface of the back-sheet may be configured to be attached to the roofing substrate. In some embodiments, the second surface of the back-sheet may be configured to be attached to the roofing substrate using any suitable means known to those skilled in the art, including adhesives, nails, staples, or any combination thereof.

In some embodiments, the second surface of the back-sheet may comprise an adhesive. In some embodiments, the adhesive may comprise any suitable adhesive known to those skilled in the art that may be configured to attach the back-sheet to a roofing substrate. In some embodiments, the adhesive may be a self-adhering adhesive that may be configured to prove nail sealability, ice dam protection, leak barrier properties listed in ASTM D 1970, or combinations thereof. In some embodiments, the adhesive may comprise polyolefin polymer, poly-alpha-olefin (APAO/APO) polymer, Butyl, SIS, SBS, SEBS, SBR, ethylene vinyl acetate, poly vinyl acetate, acrylic adhesives, polyurethane, silane terminated polymer, asphaltic adhesives, hot melt adhesives, non-asphaltic adhesives, or any combination thereof.

In some embodiments, the adhesive may have a thickness from 1 mil to 100 mils, from 1 mil to 90 mils, from 1 mil to 80 mils, from 1 mil to 70 mils, from 1 mil to 60 mils, from 1 mil to 50 mils, from 1 mil to 40 mils, from 1 mil to 30 mils, from 1 mil to 20 mils, or from 1 mil to 10 mils.

In some embodiments, the adhesive may have a thickness from 1 mil to 100 mils, from 10 mils to 100 mils, from 20 mils to 100 mils, from 30 mils to 100 mils, from 40 mils to 100 mils, from 50 mils to 100 mils, from 60 mils to 100 mils, from 70 mils to 100 mils, from 80 mils to 100 mils, or from 90 mils to 100 mils.

In some embodiments, the adhesive may have a thickness from 1 mil to 100 mils, from 10 mils to 90 mils, from 20 mils to 80 mils, from 30 mils to 70 mils, or from 40 mils to 60 mils.

In some embodiments, the roofing system may further comprise a removable cover. In some embodiments, the removable cover may be removably attached to the second surface of the back-sheet. In some embodiments, the removable cover may be removably attached to the adhesive on the second surface of the back-sheet. In some embodiments, the removable cover may comprise any suitable material known to those skilled in the art that may be configured to be attached to the adhesive and that may be configured to be removed from the adhesive without affecting the adhesive properties of the adhesive.

Some embodiments of the present disclosure are directed to methods. In some embodiments, the method may include attaching the first photovoltaic module and the second photovoltaic module to the first side of the back-sheet. In some embodiments, the back-sheet may be sized such that both the first photovoltaic module and the second photovoltaic module may be attached thereto. In some embodiments, the first photovoltaic module may be positioned adjacent to the second photovoltaic module on the first side of the back-sheet. In some embodiments, the first photovoltaic module may be positioned substantially parallel to the second photovoltaic module on the first side of the back-sheet. In some embodiments, the first photovoltaic module and the second photovoltaic module may be attached to the first side of the back-sheet using any suitable means known to know skilled in the art including adhesives, mechanical attachments, lamination, extrusion, co-extrusion, rolling, or any combination thereof.

In some embodiments, the method may also include forming a seam on the back-sheet between the first and second photovoltaic modules. The seam may be formed using any suitable means known to those skilled in the art, including by thermal welding, ultrasonic welding, an adhesive, tape, or any combination thereof.

In some embodiments, the method includes forming a connection between the first and second photovoltaic modules. In some embodiments, forming a connection may include forming an electrical connection between the first and second photovoltaic modules. In some embodiments, the electrical connection may be formed by electrically connecting the first photovoltaic module to the second photovoltaic module using the electrical connector. In some embodiments, forming the electrical connection may including using the electrical connector to connect the first end of the first photovoltaic module to the second end of the second photovoltaic module.

In some embodiments, the method includes separating the first photovoltaic module and the second photovoltaic module along the seam on the back-sheet. In some embodiments, the first photovoltaic module and the second photovoltaic module may be separated along the seam on the back-sheet while maintaining the electrical connection between the first and second photovoltaic modules. Separating the first and second photovoltaic modules may be accomplished by any suitable means known to those skilled in the art. For example, in some embodiments, separating the first photovoltaic module and the second photovoltaic module may include cutting along the seam on the back-sheet.

In some embodiments, the method may include attaching the second side of the back-sheet to the roofing substrate. The second side of the back-sheet may be attached to the roofing substrate using any suitable means known to those skilled in the art. For example, in some embodiments, attaching the second side of the back-sheet to the roofing substrate may include nailing, stapling, or using a self-adhered or liquid applied adhesive.

The present disclosure will now be described with reference to non-limiting exemplary embodiments depicted in FIGS. 1-3.

FIG. 1 depicts an exemplary embodiment of a plurality of photovoltaic modules 10, 12, 14, 16, in a first configuration. As shown in FIG. 1, a first photovoltaic module 10, a second photovoltaic module 12, a third photovoltaic module 14, and a fourth photovoltaic module 16 may be attached to a back-sheet 20. In the exemplary embodiment of FIG. 1, the first photovoltaic module 10 may include a length and a width, and the length may be greater than the width; the second photovoltaic module 12 may include a length and a width, and the length may be greater than the width; the third photovoltaic module 14 may include a length and a width, and the length may be greater than the width; and the fourth photovoltaic module 16 may include a length and a width, and the length may be greater than the width.

The exemplary embodiment of FIG. 1 depicts that a seam 22 may be formed on the back-sheet 20 between the first photovoltaic module 10 and the second photovoltaic module; a seam 22 may be formed on the back-sheet 20 between the second photovoltaic module 12 and the third photovoltaic module 14; and a seam 22 may be formed on the back-sheet 20 between the third photovoltaic module 14 and the fourth photovoltaic module 16.

In the exemplary embodiment of FIG. 1, the first photovoltaic module 10 may be substantially parallel to the second photovoltaic module 12, the second photovoltaic module 12 may be substantially parallel to the third photovoltaic module 14, and the third photovoltaic module 14 may be substantially parallel to the fourth photovoltaic module 16.

As shown in the exemplary embodiment of FIG. 1, the first photovoltaic module may have a first end 10a and a second end 10b, the second photovoltaic module may have a first end 12a and a second end 12b, the third photovoltaic module may have a first end 14a and a second end 14b, and the fourth photovoltaic module may have a first end 16a and a second end 16b. An electrical connector 18 may connect the first end of the first photovoltaic module 10a to the second end of the second photovoltaic module 12b. In addition, an electrical connector 18 may connect the first end of the second photovoltaic module 12a to the second end of the third photovoltaic module 14b; and an electrical connector may connect the first end of the third photovoltaic module 14a to the second end of the fourth photovoltaic module 16b.

Figure 2:
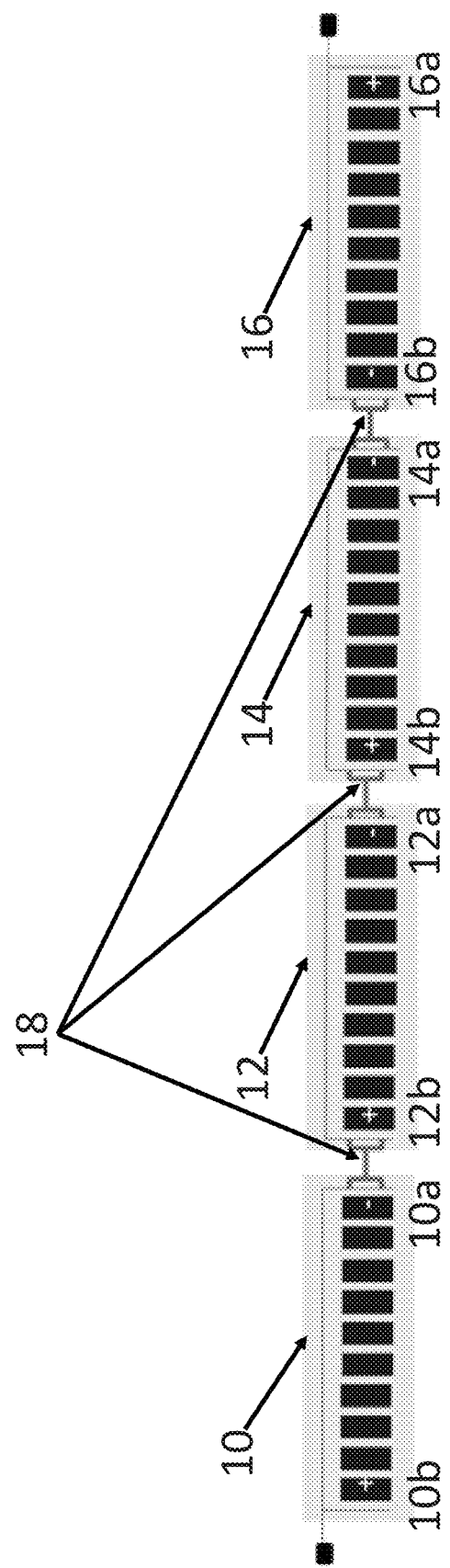
FIG. 2 depicts an exemplary embodiment of the plurality of photovoltaic modules in a second configuration.

FIG. 2 depicts an exemplary embodiment of the plurality of photovoltaic modules 10, 12, 14, and 16 in a second configuration. This second configuration may be formed by separating the first photovoltaic module 10 from the second photovoltaic module 12, by separating the second photovoltaic module 12 from the third photovoltaic module 14, and by separative the third photovoltaic module 14 from the fourth photovoltaic module 16 along the seams 22 in the back-sheet 20. For example, in the exemplary embodiment of FIG. 2, the photovoltaic modules may be separated from one another by cutting along the seams 22 in the back-sheet. As shown in the exemplary embodiment of FIG. 2, the first photovoltaic module 10 may be separated from the second photovoltaic module 12 while maintaining the electrical connection therebetween, the second photovoltaic module 12 may be separated from the third photovoltaic module 14 while maintaining the electrical connection therebetween, and the third photovoltaic module 14 may be separated from the third photovoltaic module 16 while maintaining the electrical connection therebetween.

Figure 3:
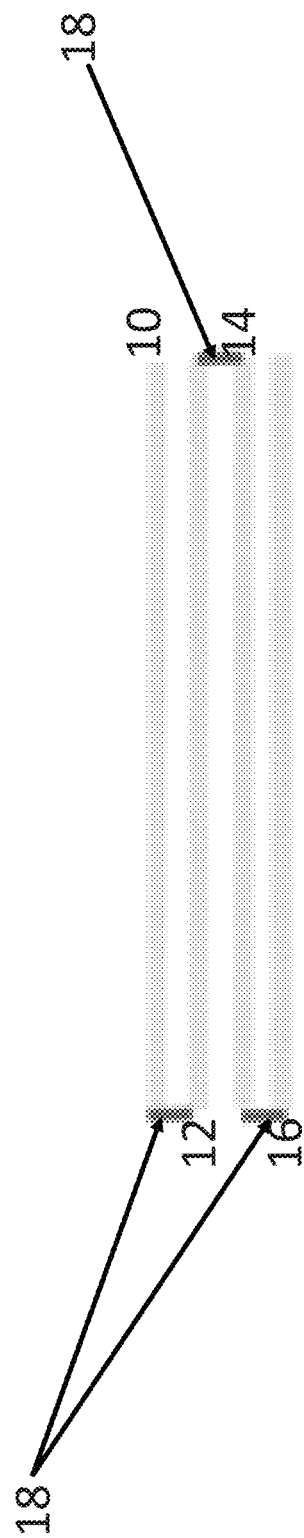
FIG. 3 depicts an exemplary embodiment of the plurality of photovoltaic modules in a third configuration.

FIG. 3 depicts an exemplary embodiment of the plurality of photovoltaic modules 10, 12, 14, and 16 according to a third configuration. As shown in FIG. 3, the first photovoltaic module 10 may be folded relative to the second photovoltaic module 12, the second photovoltaic module may be folded relative to the third photovoltaic module 14, and the third photovoltaic module may be folded relative to the fourth photovoltaic module 16 such that a stack of the first photovoltaic module 10, the second photovoltaic module 12, the third photovoltaic module 14, and the fourth photovoltaic module 16 may be formed.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. A method comprising:
attaching a first photovoltaic module and a second photovoltaic module to a back-sheet, wherein the first photovoltaic module includes a first end and a second end, and wherein the second photovoltaic module includes a first end and a second end;
forming a seam on the back-sheet between the first and second photovoltaic modules;
forming an electrical connection between the first and second photovoltaic modules by electrically connecting the first end of the first photovoltaic module to the second end of the second photovoltaic module; and
separating the first and second photovoltaic modules along the seam while maintaining the electrical connection between the first and second photovoltaic modules.

2. The method of claim 1, wherein attaching the first and second photovoltaic modules to the back-sheet includes laminating the first and second photovoltaic modules to the back-sheet.

3. The method of claim 1, wherein attaching the first and second photovoltaic modules to the back-sheet comprises attaching the first photovoltaic module substantially parallel to the second photovoltaic module.

4. The method of claim 1, wherein the back-sheet comprises TPO.

5. The method of claim 1, wherein the back-sheet is configured to electrically insulate the first and second photovoltaic modules.

6. The method of claim 1, wherein the back-sheet is configured to be attached to a roofing substrate.

7. The method of claim 1, further comprising attaching the back-sheet to a roofing substrate.

8. The method of claim 7, wherein attaching the back-sheet to a roofing substrate includes nailing the back-sheet to a roofing substrate.

9. The method of claim 1, further comprising using an adhesive to attach the back-sheet to a roofing substrate.

10. The method of claim 1, wherein separating the first and second photovoltaic modules along the seam comprises cutting along the seam.

11. The method of claim 1, wherein the electrically connected first and second photovoltaic modules are operable with a single junction box, a pair of connectors, and a single optimizer.

12. The method of claim 1, wherein the first photovoltaic module includes a length and a width, and wherein the length is greater than the width.

13. The method of claim 1, wherein the second photovoltaic module includes a length and a width, and wherein the length is greater than the width.

14. The method of claim 1, further comprising folding the first photovoltaic module relative to the second photovoltaic module to form a stack of the first and second photovoltaic modules.

15. The method of claim 1, wherein the first and second photovoltaic modules are solar shingles.

* * * * *